(12) United States Patent
Wang

(10) Patent No.: US 10,913,461 B2
(45) Date of Patent: Feb. 9, 2021

(54) DRIVING BEHAVIOR DETERMINING METHOD, APPARATUS, AND DEVICE, AND STORAGE MEDIUM

(71) Applicant: TENCENT TECHNOLOGY (SHENZHEN) COMPANY LIMITED, Shenzhen (CN)

(72) Inventor: Dafeng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 25 days.

(21) Appl. No.: 16/428,332

(22) Filed: May 31, 2019

(65) Prior Publication Data
US 2019/0283763 A1    Sep. 19, 2019

Related U.S. Application Data

(63) Continuation of application No. PCT/CN2018/075954, filed on Feb. 9, 2018.

(30) Foreign Application Priority Data

Mar. 6, 2017   (CN) .......................... 2017 1 0127810

(51) Int. Cl.
*B60W 40/09*        (2012.01)
*B60W 30/095*       (2012.01)
(Continued)

(52) U.S. Cl.
CPC ............. *B60W 40/09* (2013.01); *B60R 16/02* (2013.01); *B60R 16/023* (2013.01);
(Continued)

(58) Field of Classification Search
CPC .. G06Q 40/08; B60W 30/14; B60W 30/0953; B60W 30/095; B60W 30/085; B60W 30/08; B60W 40/09
See application file for complete search history.

(56) References Cited

U.S. PATENT DOCUMENTS 9,836,963 B1 * 12/2017 Hayward ................. G07C 5/02
10,475,127 B1 * 11/2019 Potter .................... B60W 40/09
(Continued)

FOREIGN PATENT DOCUMENTS

| CN | 101161524 A | 4/2008 |
| CN | 103043021 A | 4/2013 |

(Continued)

OTHER PUBLICATIONS

The State Intellectual Property Office of the People's Republic of China (SIPO) Office Action 1 for 201710127810.7 dated Mar. 7, 2019 7 Pages (including translation).
(Continued)

*Primary Examiner* — Carlos Garcia
(74) *Attorney, Agent, or Firm* — Anova Law Group, PLLC

(57) ABSTRACT

A driving behavior determining method, apparatus, and device, and a storage medium are provided. The method includes obtaining, by a computing device, a driving video of a target vehicle. A content of the driving video includes a road and a neighboring vehicle of the target vehicle, and the neighboring vehicle includes at least one of a front vehicle in front of the target vehicle and a rear vehicle at a rear of the target vehicle. The method also includes: obtaining, by the computing device, vehicle running information that comprises a running status of the target vehicle; and determining, by the computing device, whether a dangerous driving behavior exists according to the driving video and the vehicle running information corresponding to a same
(Continued)

201 — Obtain a driving video, a content of the driving video including a road image and a neighboring vehicle of a target vehicle 202 — Obtain vehicle running information that comprises a running status of the target vehicle 203 — Determine whether there is a dangerous driving behavior according to the driving video and the vehicle running information corresponding to a same time, the dangerous driving behavior being a driving behavior having an accident risk time period. The dangerous driving behavior is a driving behavior having an accident risk.

20 Claims, 6 Drawing Sheets

(51) Int. Cl.
*G06Q 40/08* (2012.01)
*G07C 5/08* (2006.01)
*B60R 16/023* (2006.01)
*B60R 16/02* (2006.01)

(52) U.S. Cl.
CPC ......... *B60W 30/0953* (2013.01); *G06Q 40/08* (2013.01); *G07C 5/08* (2013.01); *B60W 2420/42* (2013.01); *B60W 2554/80* (2020.02)

(56) References Cited

U.S. PATENT DOCUMENTS

| | | | | |
|---|---|---|---|---|
| 2014/0114532 A1* | 4/2014 | Choi | .................. | F02N 11/0807 |
| | | | | 701/36 |
| 2014/0379384 A1* | 12/2014 | Duncan | .................. | G06Q 40/08 |
| | | | | 705/4 |
| 2014/0379385 A1* | 12/2014 | Duncan | .................. | G07C 5/008 |
| | | | | 705/4 |
| 2015/0279128 A1 | 10/2015 | Izumi et al. | | |
| 2017/0061222 A1* | 3/2017 | Hoye | .................. | G06K 9/00791 |
| 2017/0132850 A1* | 5/2017 | Liu | ...................... | G07C 5/0866 |

FOREIGN PATENT DOCUMENTS

| | | |
|---|---|---|
| CN | 104077819 A | 10/2014 |
| CN | 104260723 A | 1/2015 |
| CN | 105206052 A | 12/2015 |
| CN | 105698874 A | 6/2016 |
| CN | 105956625 A | 9/2016 |
| CN | 106447496 A | 2/2017 |
| DE | 102013021866 A1 | 6/2015 |
| JP | 2000194995 A | 7/2000 |
| JP | 2009128486 A | 6/2009 |
| JP | 2015184968 A | 10/2015 |
| JP | 2016197378 A | 11/2016 |

OTHER PUBLICATIONS

Korean Intellectual Property Office (KIPO) Office Action 1 for 20197025758 dated Jun. 23, 2020 17 Pages (including translation).
The State Intellectual Property Office of the People's Republic of China (SIPO) Office Action 1 for 201710127810.7 dated Oct. 29, 2019 8 Pages (including translation).
The Japan Patent Office (JPO) Notification of Reasons for Refusal for Application No. 2019-528487 and Translation dated Aug. 17, 2020 8 Pages.

* cited by examiner

DRIVING BEHAVIOR DETERMINING METHOD, APPARATUS, AND DEVICE, AND STORAGE MEDIUM

CROSS-REFERENCES TO RELATED APPLICATIONS

This application is a continuation application of PCT Patent Application No. PCT/CN2018/075954, filed on Feb. 9, 2018, which claim priority to Chinese Patent Application No. 201710127810.7, filed with the China National Intellectual Property Administration on Mar. 6, 2017 and entitled "DRIVING BEHAVIOR DETERMINING METHOD AND APPARATUS", the entire contents of both of which are incorporated herein by reference.

FIELD OF TECHNOLOGY

Embodiments of the present disclosure relate to the field of connected cars, and in particular, to a driving behavior determining method, apparatus, and device, and a storage medium.

BACKGROUND OF THE DISCLOSURE

With the continuous enhancement of people's insurance awareness, more vehicle owners select to purchase insurance for vehicles they purchased, to reduce financial loss when an accident occurs.

Usage based insurance (UBI), as driving behavior-based insurance, is widely applied to the vehicle insurance industry. After a vehicle owner selects the UBI, an On-Board Diagnostic (OBD) device needs to be mounted on a vehicle. In a driving process, the OBD device acquires corresponding sensor data by using a built-in acceleration sensor and gyroscope, and then determines a current running status of the vehicle according to the sensor data. In this way, a vehicle insurance company determines a driving style of the vehicle owner based on the running status determined by the OBD device, and finally develops a corresponding insurance strategy according to the driving style. For example, for vehicle owners who usually apply emergency braking or take a sharp turn in a driving process, the vehicle insurance company determines that this type of vehicle owner have a radical driving style, and increases an amount of insurance premium paid by this type of vehicle owner.

However, it is relatively one-sided to determine a driving behavior of a vehicle owner according to a running status of a vehicle only, and easy to cause misjudgment of a dangerous driving behavior. For example, emergency braking applied by the vehicle owner in a congested road section is incorrectly considered as a dangerous driving behavior, which further affects accuracy of the insurance strategy developed by the vehicle insurance company.

SUMMARY

Embodiments of the present disclosure provide a driving behavior determining method, apparatus, and device, and a storage medium, to resolve the problem in the existing technologies that it is relatively one-sided to determine a driving behavior of a vehicle owner according to a running status of a vehicle only, and easy to cause misjudgment of a dangerous driving behavior, which further affects accuracy of an insurance strategy developed by a vehicle insurance company. The technical solutions are as follows:

According to a first aspect of the embodiments of the present disclosure, a driving behavior determining method is provided, and the method includes: obtaining, by a computing device, a driving video of a target vehicle. A content of the driving video includes a road and a neighboring vehicle of the target vehicle, and the neighboring vehicle includes at least one of a front vehicle in front of the target vehicle and a rear vehicle at a rear of the target vehicle. The method also includes: obtaining, by the computing device, vehicle running information that comprises a running status of the target vehicle; and determining, by the computing device, whether a dangerous driving behavior exists according to the driving video and the vehicle running information corresponding to a same time period. The dangerous driving behavior is a driving behavior having an accident risk.

According to a second aspect of the embodiments of the present disclosure, a driving behavior determining apparatus is provided, and the apparatus includes a memory and a processor coupled to the memory. The processor is configured to perform: obtaining a driving video of a target vehicle. A content of the driving video includes a road and a neighboring vehicle of the target vehicle, and the neighboring vehicle includes at least one of a front vehicle in front of the target vehicle and a rear vehicle at a rear of the target vehicle. The processor is also configured to perform: obtaining vehicle running information that comprises a running status of the target vehicle; and determining whether a dangerous driving behavior exists according to the driving video and the vehicle running information corresponding to a same time period. The dangerous driving behavior is a driving behavior having an accident risk.

According to a third aspect of the embodiments of the present disclosure, a driving behavior determining device is provided. The device includes a processor and a memory, the memory stores at least one instruction, and at least one instruction is loaded and executed by the processor, to implement the driving behavior determining method according to the first aspect.

According to a fourth aspect of the embodiments of the present disclosure, a computer-readable storage medium is provided. The storage medium stores at least one instruction, and at least one instruction is loaded and executed by a processor, and cause the processor to perform: obtaining a driving video of a target vehicle. A content of the driving video includes a road and a neighboring vehicle of the target vehicle, and the neighboring vehicle includes at least one of a front vehicle in front of the target vehicle and a rear vehicle at a rear of the target vehicle. The at least one instruction also causes the processor to perform: obtaining vehicle running information that comprises a running status of the target vehicle; and determining whether a dangerous driving behavior exists according to the driving video and the vehicle running information corresponding to a same time period. The dangerous driving behavior is a driving behavior having an accident risk.

Beneficial effects of the technical solutions provided in the embodiments of the present disclosure at least include:

The driving video including the road image and the vehicle images and the vehicle running information representing the running status of the vehicle are obtained, so that the dangerous driving behavior of the vehicle is comprehensively determined based on the driving video and the vehicle running information. Compared with determining whether there is the dangerous driving behavior according to the running status of the vehicle only, determining the dangerous driving behavior with reference to a more visual driving video provides more comprehensive determining bases, enhances accuracy of a determining result, and further enhances accuracy of an insurance strategy developed based on the determining result.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of embodiments of the present disclosure clearer, the following further describes the implementations of the present disclosure in detail with reference to the accompanying drawings.

Figure 1:
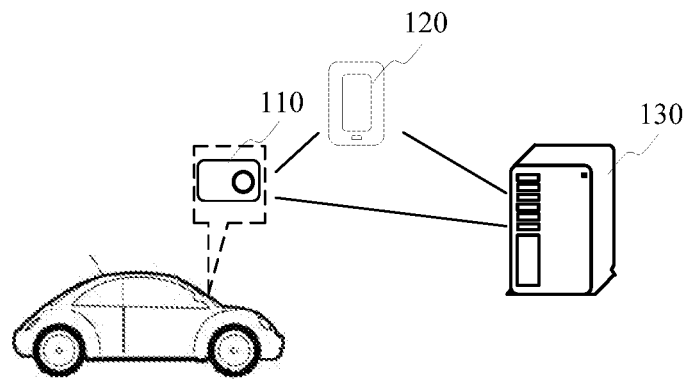
FIG. 1 is a schematic diagram of an implementation environment according to an embodiment of the present disclosure.

FIG. 1 is a schematic diagram of an implementation environment according to an embodiment of the present disclosure. The implementation environment includes: a driving recording device 110, a mobile terminal 120, and a server 130.

The driving recording device 110 is an electronic device that is disposed in a vehicle and that is used for recording a driving video. The driving recording device 110 is an event data recorder or a vehicle navigation device equipped with a camera. Optionally, the driving recording device 110 is disposed in the front of the vehicle and configured to record a driving video of a front of the vehicle in a driving recording process, or driving recording devices 110 are disposed in the front and at the rear of the vehicle and configured to record driving videos of a front and a rear of the vehicle in a driving recording process.

A wired or wireless connection is established between the driving recording device 110 and the mobile terminal 120. Optionally, the driving recording device 110 establishes a wired connection with the mobile terminal 120 by using a data line, and exchanges data by using the data line. Alternatively, the driving recording device 110 establishes a wireless connection with the mobile terminal 120 through Bluetooth or infrared rays, and exchanges data by using the wireless connection.

The mobile terminal 120 is an electronic device having an Internet access function, and the electronic device is a smartphone, a tablet computer, a wearable intelligent device, or the like. In a possible implementation, when the driving recording device 110 does not have the Internet access function, the mobile terminal 120 obtains, by using the connection between the mobile terminal 120 and the driving recording device 110, data sent by the driving recording device 110, and reports the obtained data over the Internet.

Optionally, the mobile terminal 120 or the driving recording device 110 is further connected to an OBD device mounted on the vehicle, and obtains vehicle running information acquired by the OBD device in a vehicle running process. The vehicle running information is used to represent a running status of the vehicle, and includes at least one of a current speed, a current acceleration, and steering information of the vehicle.

In some embodiments of the present disclosure, the driving recording device 110 or the mobile terminal 120 may be provided with an Artificial Intelligence (AI) algorithm, or the data recorded by the driving recording device 110 or the mobile terminal 120 may be transmitted to and analyzed by a computing device (e.g., a device onboard the vehicle or a remote device wirelessly connected to the vehicle) that is provided with AI algorithm. By using the AI algorithm, contents of a driving video, such as road(s), vehicle(s), pedestrian(s), etc., can be recognized, and information such as a running lane, a distance to a front vehicle (or a rear vehicle), a speed relative to the front vehicle (or the rear vehicle) can be extracted according to the recognized content. The driving video may include a plurality of consecutive image frames captured at a plurality of time stamps. Some image frame may include contents such as roads/lanes, neighboring vehicle (e.g., neighboring may refer to front, back, left, and/or right side of the vehicle), and neighboring pedestrians. A road image, as used herein, may refer to a part of or a whole of one image frame of the driving video that includes a road or a lane (e.g., certain surrounding area of the road/lane may also be included). A vehicle image, as used herein, may refer to a part of or a whole of one image frame of the driving video that includes a neighboring vehicle. In some embodiments, a vehicle image and a road image corresponding to a same moment may be the same image. The same road/lane or the same vehicle may occur in multiple image frames of the driving video. The computing device may recognize the same road/lane or the same vehicle in the multiple image frames and analyze a relative relationship (e.g., relative speed, lane change, etc.) between the vehicle itself and the road or the neighboring vehicle based on pixel location variations or other factors using image/video processing techniques. Further, by using the AI algorithm, the driving recording device 110 or the mobile terminal 120 can quantify a recognized dangerous driving behavior, and obtain driving behavior data corresponding to the dangerous driving behavior.

The mobile terminal 120 and the server 130 are connected by using a wired network or a wireless network.

The server 130 is a server configured to manage driving behavior data corresponding to the vehicle. The driving behavior data is reported (reported in real time or reported at a pre-determined time interval in the vehicle running process) by the driving recording device 110 or the mobile terminal 120. The server 130 is a server cluster formed by a plurality of servers or a cloud computing center.

In a possible implementation, when the driving recording device 110 does not have the Internet access function, the server 130 receives update data (which is obtained by analyzing the driving video and the vehicle running information that are acquired by the driving recording device 110) sent by the mobile terminal 12, and updates stored driving behavior data according to the update data.

In another possible implementation, when the driving recording device 110 has the Internet access function, and establishes a wireless connection with the server 130, the server 130 receives update data (which is calculated according to a real-time driving behavior) that is uploaded by the driving recording device 110 over the Internet, and updates stored driving behavior data according to the update data.

Optionally, the wireless network or the wired network uses a standard communications technology and/or protocol. The network is generally the Internet, but may also be any network which includes but is not limited to, a local area network (LAN), a metropolitan area network (MAN), a wide area network (WAN), a mobile, wired, or wireless network, or any combination of a dedicated network or a virtual dedicated network. In some embodiments, data exchanged over the network is represented by using a technology and/or a format including a Hypertext Markup Language (HTML), an Extensible Markup Language (XML), and the like. In addition, all or some links may be encrypted by using conventional encryption technologies such as a Secure Socket Layer (SSL), a Transport Layer Security (TLS), a Virtual Private Network (VPN), and Internet Protocol Security (IPsec). In some other embodiments, the data communications technologies described above may further be replaced with or supplemented by a customized and/or dedicated data communications technology.

The driving behavior determining method provided in various embodiments of the present disclosure may be performed by the driving recording device 110 separately, performed by the mobile terminal 120 separately, performed by the driving recording device 110 and the mobile terminal 120 in cooperation, or performed by the server 130.

Optionally, when the driving behavior determining method is performed by the server 130, the driving recording device 110 or the mobile terminal 120 uploads acquired driving video and vehicle running information to the server 130, and the server 130 determines whether the vehicle has a dangerous driving behavior at each moment according to a timestamp corresponding to the driving video and the vehicle running information.

For ease of description, the various embodiments below describe an example in which the driving behavior determining method is performed by the mobile terminal 120, but the various embodiments are not limited thereto.

In the related technology, determining of a driving behavior depends on sensor data acquired by the OBD device, and only the running status of the vehicle such as applying emergency braking, applying emergency startup, and taking a sharp turn can be determined by using the sensor data. However, if only the sensor data is used as a basis for determining the driving behavior, when the OBD device falls or the vehicle naturally jitters, the sensor data acquired by the OBD device cannot accurately reflect a current running status of the vehicle, and accuracy of determining the driving behavior is affected. Moreover, it is relatively one-sided and indirect to measure an accident occurrence risk merely according to the running status of the vehicle, such as applying emergency braking, applying emergency startup, and taking a sharp turn, without considering a running status of another vehicle, and consequently, the determined driving behavior has relatively low reference value and accuracy.

However, in the various embodiments of the present disclosure, whether the vehicle has a dangerous driving behavior is determined by using an AI algorithm and based on both the driving video (an external circumstance) and the vehicle running information (the running status of the vehicle) in a running process, so that bases for determining the dangerous driving behavior are abundant, and accuracy of determining the dangerous driving behavior is improved. Moreover, since dangerous driving behaviors having a relatively high accident risk, such as departing from a lane, keeping an excessively short distance between vehicles, and applying emergency braking, can be recognized from the driving video, the determined dangerous driving behaviors have higher reference value and are more comprehensive and accurate. This helps a vehicle insurance company to develop a more accurate insurance strategy for a vehicle owner according to the dangerous driving behaviors.

Figure 2:
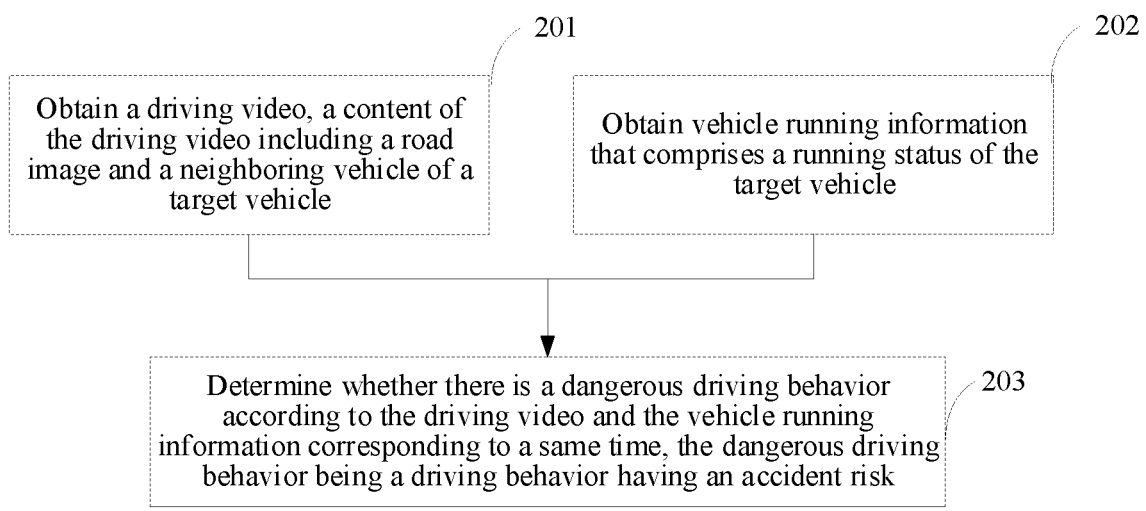
FIG. 2 is a flowchart of a driving behavior determining method according to an embodiment of the present disclosure.

FIG. 2 is a flowchart of a driving behavior determining method according to an embodiment of the present disclosure. This embodiment is described by using an example in which the driving behavior determining method is applied to the mobile terminal 120 shown in FIG. 1. The method includes:

Step 201. Obtain a driving video, the driving video including a road image and vehicle images of front and rear vehicles. In other words, a driving video of a target vehicle (i.e., the vehicle that the driving recording device is mounted on) can be obtained. A content of the driving video may include a road (e.g., a road that the target vehicle currently in, switched/turned from, and/or intended to switch to, etc.) and a neighboring object of the target vehicle (e.g., a neighboring vehicle, a nearby pedestrian, a nearby traffic light/traffic sign, etc.). The neighboring vehicle includes at least one of a front vehicle in front of the target vehicle and a rear vehicle at a rear of the target vehicle.

The driving video is a video recorded by a driving recording device by using an image acquisition component in a running status of a vehicle. Since the driving recording device is generally disposed in the front and/or at the rear of the vehicle, the driving video includes road images of a front and/or rear road and the vehicle images of the front and/or rear vehicles.

Optionally, the driving video is a real-time driving video transmitted by the driving recording device to the mobile terminal in a running process of the vehicle, or the driving video is a cached driving video transmitted by the driving recording device to the mobile terminal at a fixed time interval (for example, 5 minutes).

Step 202. Obtain vehicle running information, the vehicle running information being used to indicate a running status of a vehicle. In other words, vehicle running information that includes a running status of the target vehicle is obtained.

Optionally, the mobile terminal obtains real-time vehicle running information of the vehicle while obtaining the driving video. The vehicle running information includes a current speed and steering information of the vehicle. Optionally, the vehicle running information further includes other information used to indicate the running status of the vehicle, such as a current acceleration and a running direction. No limitation is imposed in this embodiment of the present disclosure.

In a possible implementation, the current speed, the current acceleration, and the running direction in the vehicle running information are acquired by using the driving recording device, an OBD device, or the mobile terminal by using a built-in sensor (including an acceleration sensor or a gyroscope). The steering information included in the vehicle running information is obtained by the OBD device from the vehicle. Optionally, the steering information is used to represent a startup status of a turn signal light.

Step 203. Determine whether there is a dangerous driving behavior according to the driving video and the vehicle running information corresponding to a same time period, the dangerous driving behavior being a driving behavior having an accident risk. In some embodiments, the driving video and the vehicle running information are aligned based on the recording time stamps, so that the behavior recognized from the driving video can match the running status of the vehicle at a same moment. The driving behavior can be analyzed with a more integrated and comprehensive perspective, for example, by analyzing both the behavior recognized from the driving video and the running status during a same time period (e.g., one or more aligned/corresponded consecutive/selected moments/time stamps).

After obtaining the driving video and the vehicle running information, the mobile terminal analyzes the driving video and the vehicle running information at a same moment, to determine whether the vehicle has a dangerous driving behavior. Optionally, the dangerous driving behavior includes at least one of: departing from a lane, keeping an excessively short distance between vehicles (keeping an excessively short distance to the front vehicle or to the rear vehicle), and applying emergency braking. It should be noted that, the mobile terminal may further determine, according to the driving video and the vehicle running information, other dangerous driving behaviors that may directly cause an accident. No limitation is imposed in this embodiment of the present disclosure.

Optionally, the mobile terminal performs image recognition on an obtained driving video to determine lane information and vehicle distance information, and determines, with reference to the steering information indicated by the vehicle running information, whether the vehicle has a dangerous driving behavior of departing from a lane; or the mobile terminal performs image recognition on an obtained driving video to determine vehicle distance information and relative speed information, and determines, with reference to a current speed in the vehicle running information, whether the vehicle has a dangerous driving behavior of keeping an excessively short distance between vehicles; or the mobile terminal performs image recognition on an obtained driving video to determine vehicle distance information, and determines, with reference to a current acceleration in the vehicle running information, whether the vehicle has a dangerous driving behavior of applying emergency braking.

Optionally, for the determined dangerous driving behavior, the mobile terminal reports the dangerous driving behavior to a server, and the server associates the vehicle with the dangerous driving behavior and stores the association, so as to subsequently build a driving behavior model (indicating a relationship between a driving behavior and an accident risk) corresponding to the vehicle based on a type of a dangerous behavior, a frequency of occurrence, and a danger level.

It should be noted that, when the driving recording device has a relatively strong image analysis and data processing capability, steps described above may be performed by the driving recording device. No limitation is imposed in this embodiment of the present disclosure.

In conclusion, in some embodiments, the driving video including the road image and the vehicle images and the vehicle running information representing the running status of the vehicle are obtained, so that the dangerous driving behavior of the vehicle is comprehensively determined based on the driving video and the vehicle running information. Compared with determining whether there is the dangerous driving behavior according to the running status of the vehicle only, determining the dangerous driving behavior with reference to a more visual driving video provides more comprehensive determining bases, enhances accuracy of a determining result, and further enhances accuracy of an insurance strategy developed based on the determining result.

For ease of developing a corresponding insurance strategy subsequently based on a dangerous driving behavior, the mobile terminal needs to quantify the determined dangerous driving behavior. In a possible implementation, after determining that the vehicle has a dangerous driving behavior, the mobile terminal further performs quantitative calculation on the dangerous driving behavior according to a type of the dangerous driving behavior, a danger level, and a frequency of occurrence, and reports calculated quantified data to the server, so that the server updates driving behavior data of the vehicle according to the quantified data, and further develops an insurance strategy based on the driving behavior data. A schematic embodiment is provided below for description.

Figure 3A:
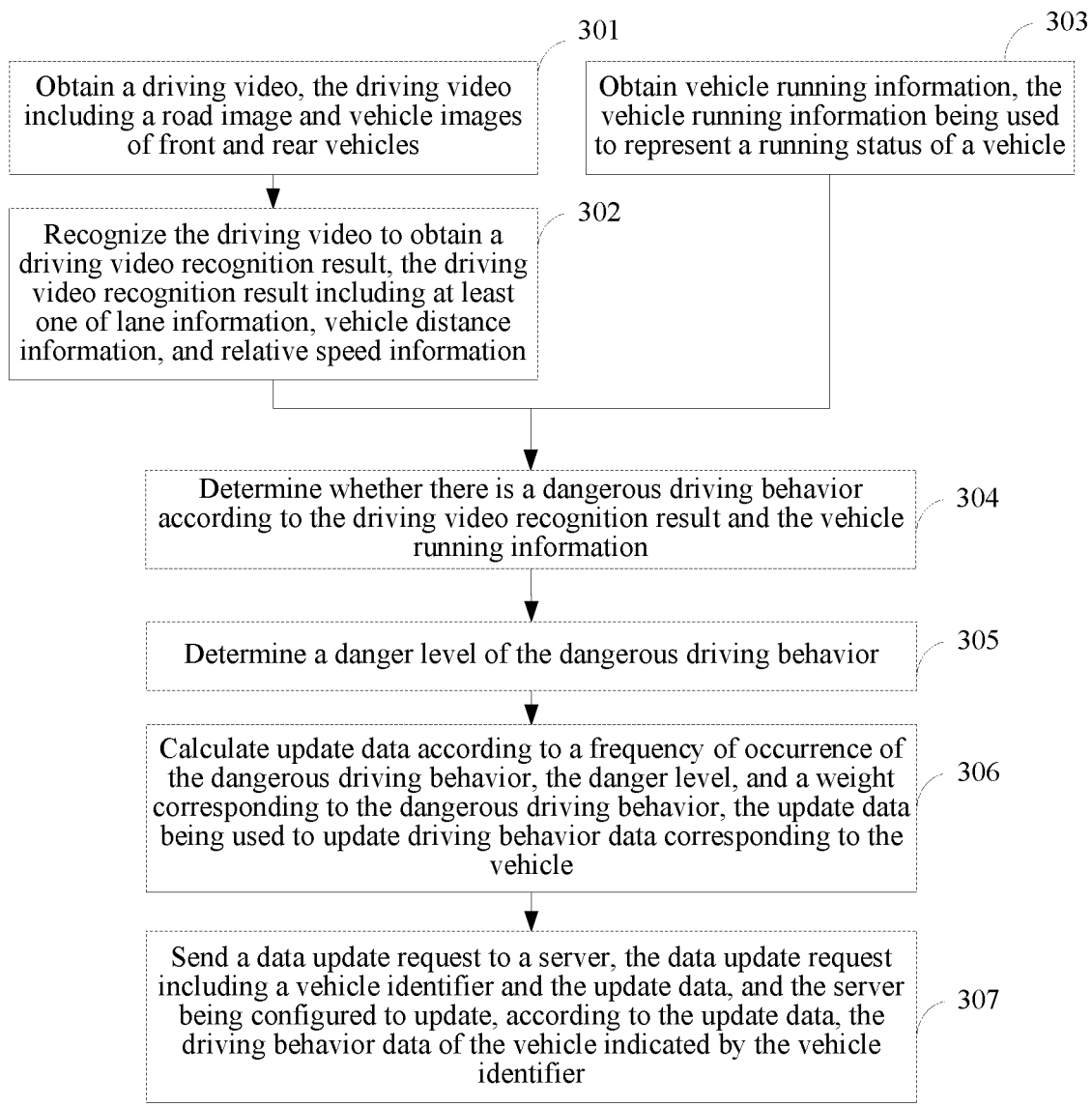
FIG. 3A is a flowchart of a driving behavior determining method according to another embodiment of the present disclosure.

FIG. 3A is a flowchart of a driving behavior determining method according to another embodiment of the present disclosure. This embodiment is described by using an example in which the driving behavior determining method is applied to the mobile terminal 120 shown in FIG. 1. The method includes:

Step 301. Obtain a driving video, the driving video including a road image and vehicle images of front and rear vehicles.

An implementation of this step is similar to that of step 201, and is not described again in this embodiment.

Figure 3B:
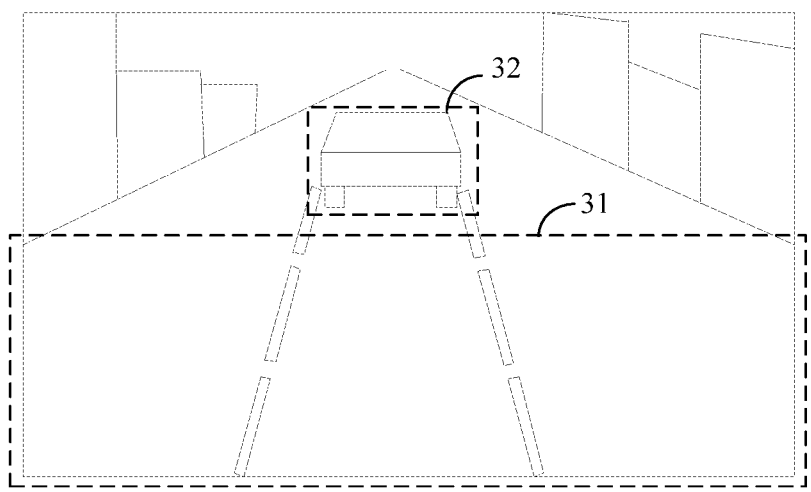
FIG. 3B is a schematic diagram of a driving video according to an embodiment.

Schematically, in a running status, a driving video acquired by a driving recording device and obtained by the mobile terminal is shown in FIG. 3B. The driving video includes a road image 31 and a vehicle image 32 of a front vehicle.

Step 302. Recognize the driving video to obtain a driving video recognition result, the driving video recognition result including at least one of lane information, vehicle distance information, and relative speed information.

After obtaining a driving video, the mobile terminal analyzes and recognizes the driving video by using an image analysis technology, to obtain a driving video recognition result including at least one of lane information, vehicle distance information, and relative speed information. The lane information is used to represent a lane in which a vehicle is located, the vehicle distance information is used to represent a distance to the front vehicle and/or a distance to a rear vehicle, and the relative speed information is used to represent a speed relative to the front vehicle and/or a speed relative to the rear vehicle.

Figure 3C:
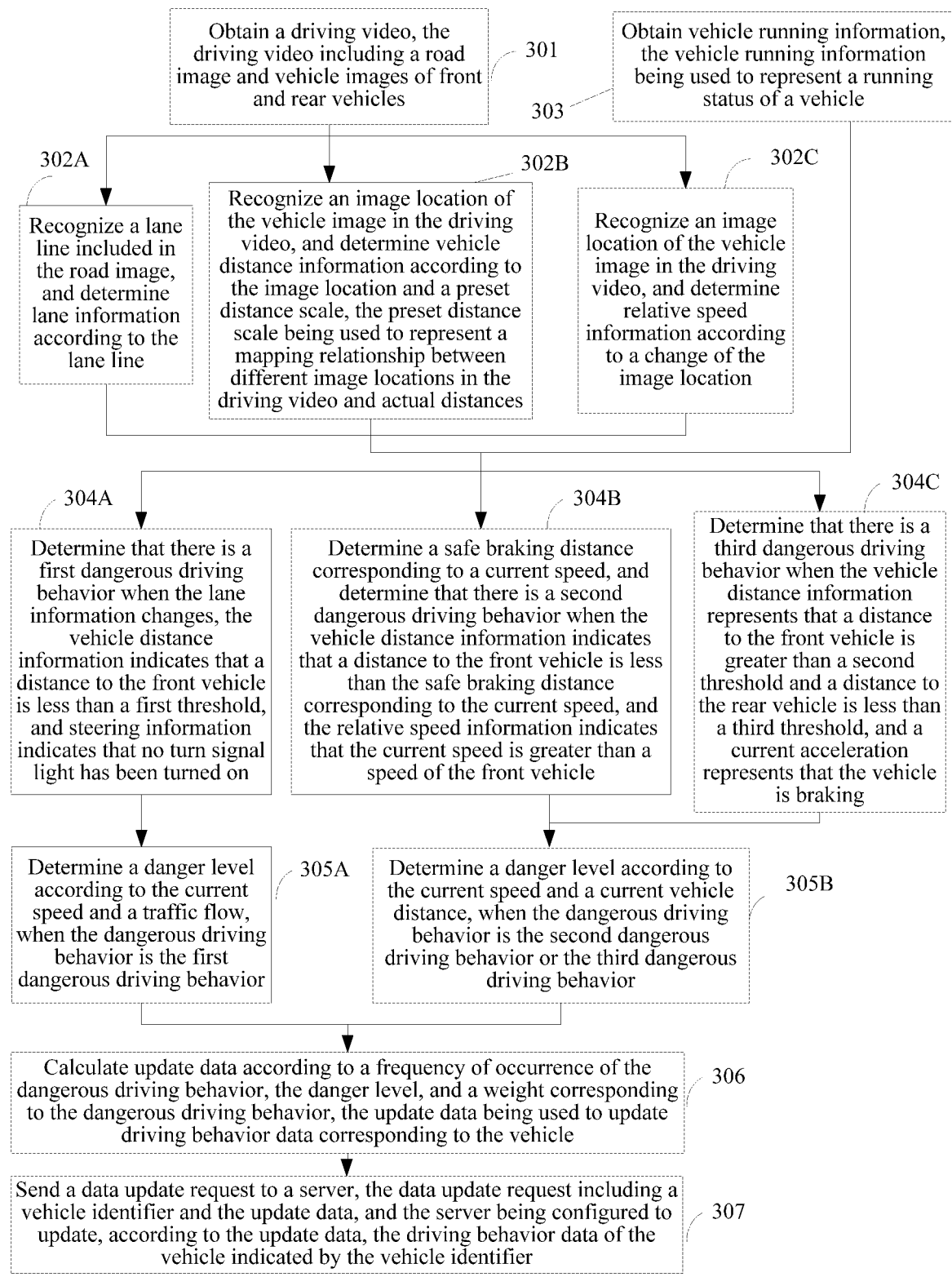
FIG. 3C is a flowchart of a driving behavior determining method according to still another embodiment of the present disclosure.

In a possible implementation, as shown in FIG. 3C, this step includes the following steps.

Step 302A. Recognize a lane line included in the road image (e.g., image frame(s) of the driving video that contains the road), and determine lane information according to the lane line.

To determine a lane in which the vehicle is currently located, the mobile terminal recognizes a lane line (also referred to as a road traffic marking, including a white dashed line, a solid white line, a yellow dashed line, a solid yellow line, a double white dashed line, a double solid white line, a double solid yellow line, a solid-cum-broken yellow line, and the like) included in the road image in the driving video, to determine the lane information based on the recognized lane line.

Figure 3D:
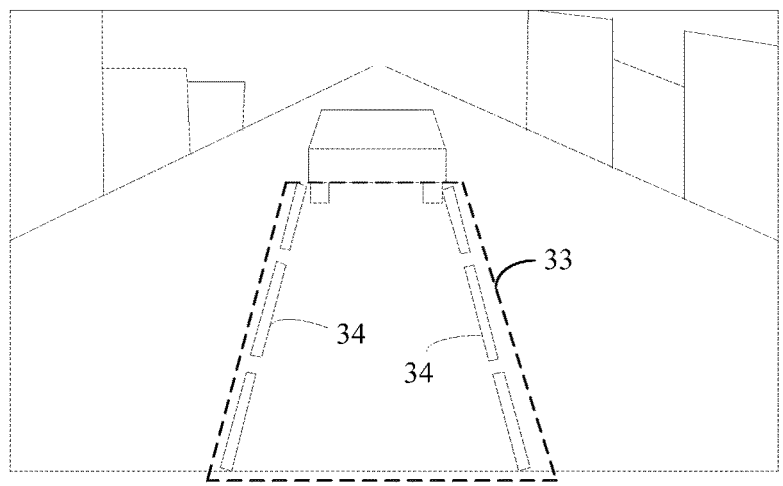
FIG. 3D is a schematic diagram of an implementation process of determining lane information in the driving behavior determining method shown in FIG. 3C.

In a possible implementation, as shown in FIG. 3D, the mobile terminal recognizes a quasi-trapezoidal area 33 (a quasi-triangular area) located in a lower half of the driving video, and further recognizes a lane line 34 included in the quasi-trapezoidal area 33, to determine the lane information according to the lane line 34. Optionally, when it is recognized that the quasi-trapezoidal area includes two lane lines, it is determined that the vehicle is located in a middle lane; when it is recognized that only a left side of the quasi-trapezoidal area includes a lane line, it is determined that the vehicle is located in a right lane; and when it is recognized that only a right side of the quasi-trapezoidal area includes a lane line, it is determined that the vehicle is located in a left lane. For example, as shown in FIG. 3D, the mobile terminal determines that the vehicle is currently in the middle lane.

In another possible implementation, the mobile terminal recognizes, by using an image recognition technology, a lane line included in the road image, and allocates a lane line number to the recognized lane line. If a lane line located in the middle of the road image is the first lane line, it is determined that the vehicle is currently located in the first lane (the leftmost lane); if a lane line located in the middle of the road image is an $n^{th}$ and an $(n+1)^{th}$ lane line, it is determined that the vehicle is currently located in the $(n+1)^{th}$ lane; and if a lane line located in the middle of the road image is an $n^{th}$ lane line, it is determined that the vehicle is currently located in an $n^{th}$ lane (the rightmost lane).

It should be noted that, alternatively, the mobile terminal may determine the lane information by using another image analysis technology. No limitation is imposed in this embodiment of the present disclosure.

Step 302B. Recognize an image location of the vehicle image in the driving video (for example, in image frame(s) of the driving video that contains the neighboring vehicle, an image location of the neighboring vehicle can be determined), and determine vehicle distance information according to the image location and a preset distance scale, the preset distance scale includes mapping relationships between image locations in the driving video and actual distances. For example, 1-pixel distance may correspond to 3-centimeter of the actual distance.

To determine whether the distance to the front vehicle (or the rear vehicle) is too short, after obtaining the driving video, the mobile terminal determines an image location of the vehicle image in the driving video in the screen, to determine an actual distance to the front vehicle (or the rear vehicle) according to the image location.

Figure 3E:
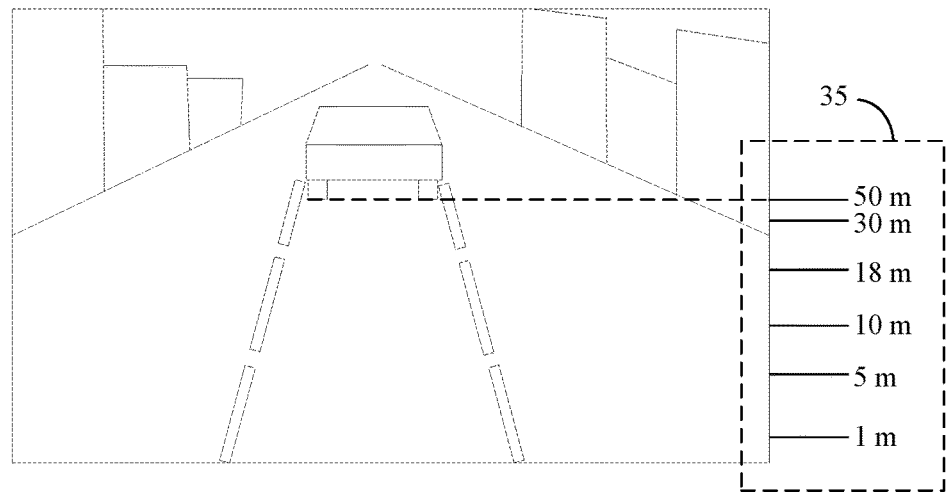
FIG. 3E is a schematic diagram of an implementation process of determining vehicle distance information in the driving behavior determining method shown in FIG. 3C.

In a possible implementation, the mobile terminal pre-stores a preset distance scale representing a mapping relationship between an image location and an actual distance. Schematically, as shown in FIG. 3E, the driving video corresponds to a preset distance scale 35. Optionally, the mobile terminal recognizes an outline of an image included in the driving video, to recognize the vehicle image of the front vehicle. Further, the mobile device determines an image location of a lower image edge of the vehicle image in the driving video, and determines the distance to the front vehicle according to the image location and the preset distance scale. For example, as shown in FIG. 3E, the mobile terminal determines that a vehicle distance to the front vehicle is 50 m.

Step 302C. Recognize an image location of the vehicle image in the driving video, and determine relative speed information according to a change of the image location.

Optionally, the relative speed information is used to represent a relationship between values of speeds of the vehicle and the front vehicle or the rear vehicle. For example, the relative speed information represents that a current speed of the vehicle is greater than a current speed of the front vehicle.

To determine a value of a speed relative to the front vehicle (or the rear vehicle), for each image frame in the driving video, the mobile terminal recognizes the image location of the vehicle image in the driving video (a specific manner is similar to step 302B), and determines the relative speed information according to a change of the image location in a neighboring image frame.

Optionally, when the value of the speed relative to the front vehicle is determined, when detecting that the image location of the vehicle image deflects downwards the lower part of the image (the vehicle distance decreases), the mobile terminal determines that the speed of the front vehicle is less than the current speed of the vehicle; or when detecting that the image location of the vehicle image deflects upwards the upper part of the image (the vehicle distance increases), the mobile terminal determines that the speed of the front vehicle is greater than the current speed of the vehicle.

Optionally, when the value of the speed relative to the rear vehicle is determined, when detecting that the image location of the vehicle image deflects downwards the lower part of the image (the vehicle distance increases), the mobile terminal determines that the speed of the rear vehicle is less than the current speed of the vehicle; or when detecting that the image location of the vehicle image deflects upwards the upper part of the image (the vehicle distance decreases), the mobile terminal determines that the speed of the rear vehicle is greater than the current speed of the vehicle.

In another possible implementation, the mobile terminal may further calculate a vehicle distance change amount according to the change of the image location, to calculate the speed of the front (or the rear) vehicle according to the current speed of the vehicle and the vehicle distance change amount, and finally calculate a relative speed difference between the vehicle and the front (or the rear) vehicle. No limitation is imposed in this embodiment.

It should be noted that, when the driving recording device has an image analysis recognition function, steps 301 and 302 may be performed by the driving recording device, and the mobile terminal 120 only needs to obtain a driving video recognition result provided by the driving recording device. No limitation is imposed in this embodiment of the present disclosure.

Step 303. Obtain vehicle running information, the vehicle running information being used to indicate a running status of a vehicle.

An implementation of this step is similar to that of step 202, and is not described again in this embodiment.

Step 304. Determine whether there is a dangerous driving behavior according to the driving video recognition result and the vehicle running information.

Optionally, the mobile terminal determines whether the vehicle has a dangerous driving behavior with reference to the vehicle running information and the driving video recognition result obtained in step 302. In a possible implementation, as shown in FIG. 3C, when the driving video recognition result includes the lane information and the vehicle distance information, and the vehicle running information includes steering information, the mobile terminal performs the following step 304A; or when the driving video recognition result includes the vehicle distance information and the relative speed information, and the vehicle running information includes a current speed, the mobile terminal performs the following step 304B; or when the driving video recognition result includes the vehicle distance information, and the vehicle running information includes a current acceleration, the mobile terminal performs the following step 304C.

Step 304A. Determine that there is a first dangerous driving behavior in response to detecting that the lane information changes, a distance to the front vehicle is less than a first threshold based on the vehicle distance information, and no turn signal light has been turned on based on the steering information, the first dangerous driving behavior being a driving behavior of departing from a lane.

In a normal running process, when needing to change a lane due to a relatively low speed of the front vehicle or needing to take a turn, a driver needs to turn on a turn signal light of the vehicle to ensure safety during lane changing, and changes the lane when keeping a particular distance to the front vehicle. Therefore, in a possible implementation, the mobile terminal detects whether the lane information obtained in step 302A changes. When detecting that the lane information changes, the mobile terminal detects whether the distance to the front vehicle is less than a first threshold according to the vehicle distance information obtained in step 302B, detects whether the vehicle has turned on the turn signal light according to the steering information, and determines that the vehicle has a dangerous driving behavior in response to detecting that the distance to the front vehicle is less than the first threshold and no turn signal light has been turned on. The first threshold has a positive correlation with the current speed. For example, the first threshold is a safe braking distance corresponding to the current speed.

For example, when detecting that the vehicle crosses a middle lane to a right lane, and the distance to the front vehicle is less than the first threshold, and no right turn signal light has been turned on, the mobile terminal determines that the vehicle departs from the lane.

According to step 304A, when the mobile terminal can recognize a lane changing status of the vehicle, the mobile terminal can further determine whether a lane changing behavior has an accident risk according to the distance to the front vehicle. Compared with that a driving behavior is recognized according to sensor data only, more abundant dangerous driving behaviors can be recognized in this embodiment, and the recognized dangerous driving behaviors more greatly match an accident occurrence probability.

Step 304B. Determine a safe braking distance corresponding to a current speed, and determine that there is a second dangerous driving behavior in response to detecting that the distance to the front vehicle is less than the safe braking distance based on the vehicle distance information and detecting that the current speed is greater than a speed of the front vehicle the relative speed information, the second dangerous driving behavior being a driving behavior of keeping an excessively short distance between vehicles.

In the running status, when the vehicle has a relatively short distance to the front vehicle, or the vehicle approaches the front vehicle quickly, there is a very large probability that a collision accident may occur. Therefore, after determining the vehicle distance to the front vehicle according to step 302B, the mobile terminal further detects whether the vehicle distance is less than the safe braking distance corresponding to the current speed, and determines that there is a dangerous driving behavior of keeping an excessively short distance between vehicles, when the vehicle distance is less than the safe braking distance corresponding to the current speed, and the relative speed information indicates that the current speed is greater than the speed of the front vehicle. Optionally, the mobile terminal pre-stores correspondences between speeds and safe braking distances in different road conditions. The correspondences are schematically shown in Table 1.

TABLE 1

| Road condition | Speed | Safe braking distance |
| --- | --- | --- |
| Dry | 40 km/h | 30 m |
| Dry | 60 km/h | 50 m |
| Slippery | 40 km/h | 50 m |
| Slippery | 60 km/h | 80 m |

In addition to looking up, according to the correspondences shown in Table 1, a safe braking distance corresponding to a speed, the mobile terminal may further calculate the safe braking distance in real time according to a proportional relationship between the current speed and the safe braking distance. The current speed and the safe braking distance are in a positive proportional relationship. No limitation is imposed in this embodiment of the present disclosure.

Optionally, when determining that the vehicle has the dangerous driving behavior, the mobile terminal prompts the driver in a pre-determined manner (for example, pronouncing a pre-determined voice prompt), to avoid an accident.

According to step 304B, the mobile terminal can recognize a behavior of keeping an excessively short distance to the front vehicle by the vehicle or approaching the front vehicle rapidly by the vehicle, and further determines the behavior as a dangerous driving behavior. Compared with the related technology in which whether the speed is too high can be recognized according to the current speed only, more dangerous driving behaviors can be recognized in this embodiment, and the recognized dangerous driving behaviors more greatly match an accident occurrence probability.

Step 304C. Determine that there is a third dangerous driving behavior in response to detecting that a distance to the front vehicle is greater than a second threshold and a distance to the rear vehicle is less than a third threshold based on the vehicle distance information, and detecting that the target vehicle is braking based on the current acceleration, the third dangerous driving behavior being a driving behavior of applying emergency braking.

In a normal running process (in an uncongested road section), when the vehicle suddenly is braking (or referred to as applying emergency braking), it is extremely easy to cause an excessively short distance to the rear vehicle, or even directly cause an accident. To recognize a case of causing an excessively short distance between vehicles due to sudden braking of the vehicle, in a running process of the vehicle, the mobile terminal obtains the distance to the front vehicle, the distance to the rear vehicle, and the current acceleration of the vehicle, and when detecting that the distance to the front vehicle is greater than the second threshold, the vehicle distance information represents that the distance to the rear vehicle is less than the third threshold, and the current acceleration represents the vehicle is braking, determines that relatively short a distance to the rear vehicle is caused because the vehicle suddenly is braking. The second threshold and the third threshold have a positive correlation with the current speed.

Different from the related technology in which emergency braking is directly determined as a dangerous driving behavior, in some embodiments, a dangerous driving behavior is determined by using the image recognition technology, to avoid that emergency braking on a congested road section is incorrectly determined as the dangerous driving behavior (because the foregoing determining condition is not satisfied even though the distance to the front vehicle is less than the second threshold when emergency braking is applied on the congested road section), thereby enhancing accuracy of determining a dangerous driving behavior.

Step 305. Determine a danger level of the dangerous driving behavior.

Optionally, after determining that there is a dangerous driving behavior, the mobile terminal further determines a danger level of the dangerous driving behavior according to data such as a traffic flow on a current road, a current speed, and vehicle distance information. A higher danger level indicates a higher probability of accident occurrence.

For different types of dangerous driving behaviors, in a possible implementation, as shown in FIG. 3C, this step includes the following steps.

Step 305A. Determine a danger level according to the current speed and a traffic flow, when the dangerous driving behavior is the first dangerous driving behavior.

Optionally, when a dangerous driving behavior indicates that the vehicle departs from a lane, the mobile terminal obtains a current speed of the vehicle, and calculates a traffic flow according to a quantity of vehicles in a driving video of pre-determined duration (for example, one minute), to determine a danger level of the dangerous driving behavior according to the current speed and the traffic flow. The current speed has a positive correlation with the danger level, and the traffic flow has a positive correlation with the danger level.

For example, the mobile terminal determines the danger level of the dangerous driving behavior according to correspondences shown in Table 2.

TABLE 2

| Current speed | Traffic flow | Danger level |
|---|---|---|
| 40 km/h | 10 vehicles/minute | 2 |
| 40 km/h | 20 vehicles/minute | 4 |
| 60 km/h | 10 vehicles/minute | 5 |
| 60 km/h | 20 vehicles/minute | 8 |

Step 305B. Determine a danger level according to the current speed and a current vehicle distance, when the dangerous driving behavior is the second dangerous driving behavior or the third dangerous driving behavior.

Optionally, when a dangerous driving behavior represents that the distance to the front vehicle is too short, the mobile terminal obtains a current speed of the vehicle and a current vehicle distance to the front vehicle, to determine a danger level according to the current speed and the current vehicle distance. The current speed has a positive correlation with the danger level, and the current vehicle distance has a negative correlation with the danger level.

For example, the mobile terminal determines the danger level of the dangerous driving behavior according to correspondences shown in Table 3.

TABLE 3

| Current speed | Current vehicle distance | Danger level |
|---|---|---|
| 40 km/h | 20 m | 2 |
| 40 km/h | 10 m | 5 |
| 60 km/h | 40 m | 3 |
| 60 km/h | 20 m | 8 |

Optionally, when a dangerous driving behavior represents that emergency braking is applied, the mobile terminal obtains a current speed of the vehicle and a current vehicle distance to the rear vehicle, to determine a danger level according to the current speed and the current vehicle distance. The current speed has a positive correlation with the danger level, and the current vehicle distance has a negative correlation with the danger level.

In other possible implementations, the mobile terminal may alternatively calculate a danger level corresponding to a dangerous driving behavior according to danger level calculation formulas corresponding to different types of dangerous driving behaviors. No limitation is imposed in this embodiment of the present disclosure.

Step 306. Calculate update data according to a frequency of occurrence of the dangerous driving behavior, the danger level, and a weight corresponding to the dangerous driving behavior, the update data being used to update driving behavior data corresponding to the vehicle. In other words, the driving behavior data corresponding to the target vehicle is updated based on the update data.

Different types of dangerous driving behaviors correspond to different accident risks, and therefore, the mobile terminal needs to convert a dangerous driving behavior into quantified data (which is update data used to update driving behavior data) by comprehensively considering a frequency of occurrence of the dangerous driving behavior, a danger level, and a weight corresponding to the dangerous driving behavior.

In a possible implementation, for dangerous driving behaviors of a same type, quantified data corresponding to the dangerous driving behavior=a frequency of occurrence of the dangerous driving behavior×a danger level×a weight of the dangerous driving behavior. For example, when a determined dangerous driving behavior indicates that the distance to the front vehicle is too short, the frequency of occurrence is two times, the danger level is level 5, and the weight is 1.5, quantified data corresponding to the dangerous driving behavior is 2×5×1.5=15. When a determined dangerous driving behavior indicates departure from a lane, the frequency of occurrence is one time, the danger level is level 8, and the weight is 2, quantified data corresponding to the dangerous driving behavior is 1×8×2=16.

It should be noted that, when the driving recording device has a relatively strong data processing capability, steps 303 to 306 may be performed by the driving recording device. No limitation is imposed in this embodiment of the present disclosure.

Step 307. Send a data update request to a server, the data update request including a vehicle identifier and the update data, and the server being configured to update, according to the update data, the driving behavior data of the vehicle indicated by the vehicle identifier.

Optionally, the mobile terminal sends update data calculated in real time to the server; or for each pre-determined time interval (for example, 10 minutes), the mobile terminal sends, to the server, update data accumulated in this time interval.

Correspondingly, after receiving the data update request carrying the update data and the vehicle identifier, the server updates, according to the update data, the driving behavior data of the vehicle indicated by the vehicle identifier.

Optionally, the data update request sent to the server further carries information, such as a type of the dangerous driving behavior, a frequency of occurrence, an occurrence place, and occurrence time, that correspond to the update data, so that the server builds a corresponding insurance model according to driving behavior data in different information dimensions, thereby further improving accuracy of an insurance strategy developed subsequently. For example, the server builds insurance models for different territories according to territorial distribution of vehicles, to develop an insurance strategy for a vehicle by using a corresponding insurance model.

It should be noted that, when the driving recording device has an Internet access function, step 307 may be performed by the driving recording device. No limitation is imposed in this embodiment of the present disclosure.

In some embodiments, the lane information, the vehicle distance information, and the relative speed information are determined by recognizing the driving video, and the dangerous driving behavior is determined based on the foregoing information, so that accuracy of determining the dangerous driving behavior is improved.

In some embodiments, the dangerous driving behaviors that may directly cause an accident, such as departing from a lane by the vehicle, keeping an excessively short distance to the front vehicle, or applying emergency braking, can be recognized with reference to the driving video, thereby further improving reference value of the recognized dangerous driving behaviors.

In some embodiments, the mobile terminal performs quantitative calculation on the dangerous driving behavior according to the type of the dangerous driving behavior, the danger level, and the frequency of occurrence, and reports the quantified data to the server, so that the server updates the driving behavior data of the vehicle according to the quantified data, and develops an insurance strategy based on the driving behavior data, thereby helping improve accuracy of the developed insurance strategy.

The following describes apparatus embodiments of the present disclosure. For details not described in the apparatus embodiments, refer to the foregoing method embodiments that are in a one-to-one correspondence with the apparatus embodiments.

Figure 4:
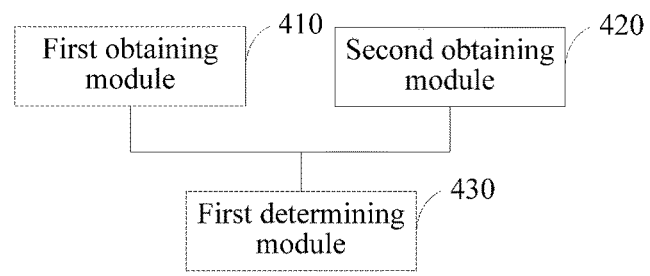
FIG. 4 is a structural block diagram of a driving behavior determining apparatus according to an embodiment of the present disclosure.

FIG. 4 is a structural block diagram of a driving behavior determining apparatus according to an embodiment of the present disclosure. The entire mobile terminal 120 or a part of the mobile terminal 120 shown in FIG. 1 is implemented by using the driving behavior determining apparatus by using hardware or a combination of hardware and software. The driving behavior determining apparatus includes: a first obtaining module 410, a second obtaining module 420, and a first determining module 430.

The first obtaining module 410 is configured to implement the function of step 201 or step 301.

The second obtaining module 420 is configured to implement the function of step 202 or step 303.

The first determining module 430 is configured to implement the function of step 203.

Optionally, the first determining module 430 includes a recognition unit and a first determining unit.

The recognition unit is configured to implement the function of step 302.

The first determining unit is configured to implement the function of step 304.

Optionally, the recognition unit is further configured to implement the function of step 302A, step 302B, or step 302C.

Optionally, vehicle running information includes a current speed and steering information.

The first determining unit is further configured to implement the function of step 304A, step 304B, or step 304C.

Optionally, the apparatus further includes: a second determining module, a calculation module, and a sending module.

The second determining module is configured to implement the function of step 305.

The calculation module is configured to implement the function of step 306.

The sending module is configured to implement the function of step 307.

Optionally, the second determining module includes a second determining unit and a third determining unit.

The second determining unit is configured to implement the function of step 305A.

The third determining unit is configured to implement the function of step 305B.

Figure 5:
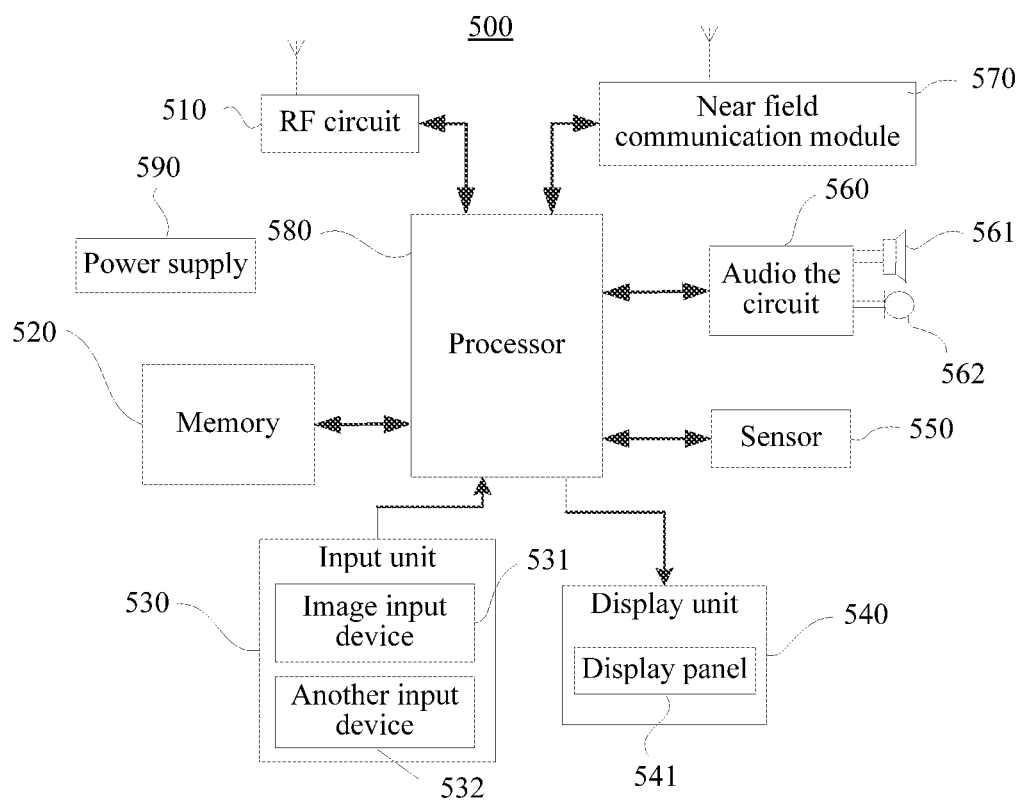
FIG. 5 is a schematic structural diagram of a driving behavior determining device according to an embodiment of the present disclosure.

FIG. 5 is a schematic structural diagram of a vehicle driving behavior determining device according to an embodiment of the present disclosure. The device 500 is a driving recording device 110 or a mobile terminal 120 in FIG. 1. Specifically:

The device 500 may include components such as a radio frequency (RF) circuit 510, a memory 520 including one or more computer readable storage media, an input unit 530, a display unit 540, a sensor 550, an audio circuit 560, a near field communication module 570, a processor 580 including one or more processing cores, and a power supply 590. A person skilled in the art may understand that a terminal structure shown in FIG. 5 constitutes no limitation on the terminal, and the terminal may include more or fewer components than those shown in the figure, or some components may be combined, or a different component deployment may be used.

The RF circuit 510 may be configured to receive and send signals during an information receiving and sending process or a call process. Particularly, after the RF circuit 510 receives downlink information from a base station, the RF circuit 510 delivers the downlink information to one or more processors 580 for processing, and sends related uplink data to the base station. Usually, the RF circuit 510 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 510 may also communicate with a network and another device through wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 520 may be configured to store a software program and module. The processor 580 runs the software program and module stored in the memory 520, to execute various functional applications and data processing. The memory 520 may mainly include a program storage area and a data storage area. The program storage area may store an operating system, an application required by at least one function (such as a sound playback function and an image display function), and the like. The data storage area may store data (such as audio data and an address book) created according to use of the device 500, and the like. In addition, the memory 520 may include a high speed random access memory, and may further include a non-volatile memory, such as at least one magnetic disk storage device, a flash memory, or another volatile solid-state storage device. Correspondingly, the memory 520 may further include a memory controller, to provide the processor 580 and the input unit 530 accesses to the memory 520.

The input unit 530 may be configured to receive input digit or character information, and generate a keyboard, mouse, joystick, optical, or track ball signal input related to the user setting and function control. Specifically, the input unit 530 may include an image input device 531 and another input device 532. The image input device 531 may be a camera, or may be a photoelectric scanning device. Except the image input device 531, the input unit 530 may further include the another input device 532. Specifically, the another input device 532 may include, but is not limited to: one or more of a physical keyboard, a functional key (such as a volume control key or a switch key), a track ball, a mouse, and a joystick.

The display unit 540 may be configured to display information input by the user or information provided for the user, and various graphical user interfaces of the device 500. The graphical user interfaces may be composed of graphics, text, icons, videos, and any combination thereof. The display unit 540 may include a display panel 541. Optionally, the display panel 541 may be configured by using a liquid crystal display (LCD), an organic light-emitting diode (OLED), or the like.

The device 500 may further include at least one sensor 550 such as an optical sensor, a motion sensor, and other sensors. Specifically, the optical sensor may include an ambient light sensor and a proximity sensor. The ambient light sensor can adjust luminance of the display panel 541 according to brightness of the ambient light. The proximity sensor may switch off the display panel 541 and/or backlight when the device 500 is moved to the ear. As one type of the motion sensor, a gravity acceleration sensor may detect a value of acceleration at each direction (which generally is triaxial), may detect a value and a direction of the gravity when being static, and may be configured to recognize an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the device 500 is not described herein again.

The audio circuit 560, a speaker 561, and a microphone 562 may provide an audio interface between the user and the terminal 500. The audio circuit 560 may convert received audio data into an electric signal and transmit the electric signal to the speaker 561. The speaker 561 converts the electric signal into a sound signal for outputting. On the other hand, the microphone 562 converts an acquired sound signal into an electric signal. The audio circuit 560 receives the electric signal and converts the electric signal into audio data, and outputs the audio data to the processor 580 for processing. Then, the processor 580 sends the audio data to, for example, another electronic device by using the RF circuit 510, or outputs the audio data to the memory 520 for further processing. The audio circuit 560 may further include an earplug jack, so as to provide communication between a peripheral earphone and the device 500.

The device 500 establishes a near field communication connection with an external device by using the near field communication module 570, and exchange data through the near field communication connection. In some embodiments, the near field communication module 570 specifically includes a Bluetooth module and/or a Wi-Fi module.

The processor 580 is the control center of the terminal 500, and is connected to various parts of the mobile phone by using various interfaces and lines. By running or executing the software program and/or module stored in the memory 520, and invoking data stored in the memory 520, the processor 580 executes various functions and data processing of the device 500, thereby performing overall monitoring on the mobile phone. Optionally, the processor 580 may include one or more processing cores. Preferably, the processor 580 may integrate an application processor and a modem processor. The application processor mainly processes an operating system, a user interface, an application and the like, and the modem processor mainly processes wireless communication. It may be understood that the modem processor may not be integrated in the processor 580.

The device 500 further includes the power supply 590 (such as a battery) for supplying power to the components. Preferably, the power supply may be logically connected to the processor 580 by using a power management system, thereby implementing functions such as charging, discharging and power consumption management by using the power management system. The power supply 590 may further include one or more of a direct current or alternating current power supply, a re-charging system, a power failure detection circuit, a power supply converter or inverter, a power supply state indicator, and any other components.

The terminal 500 may further include a Bluetooth module and the like which are not shown, and details are not described herein.

An embodiment of the present disclosure further provides a computer-readable storage medium. The storage medium stores at least one instruction, and at least one instruction is loaded and executed by a processor, to implement the driving behavior determining method according to the foregoing method embodiments.

An embodiment of the present disclosure further provides a computer program product. The computer program product stores at least one instruction, and at least one instruction is loaded and executed by a processor, to implement the driving behavior determining method according to the foregoing method embodiments.

The sequence numbers of the foregoing embodiments of the present disclosure are merely for illustrative purposes, and are not intended to indicate priorities of the embodiments.

The foregoing descriptions are merely preferred embodiments of the present disclosure, but are not intended to limit the embodiments of the present disclosure. Any modification, equivalent replacement, and improvement made without departing from the spirit and principle of the embodiments of the present disclosure shall fall within the protection scope of the embodiments of the present disclosure.

What is claimed is:

1. A driving behavior determining method, comprising:
   obtaining, by a computing device, a driving video of a target vehicle, a content of the driving video comprising a road and a neighboring vehicle of the target vehicle, the neighboring vehicle comprising at least one of a front vehicle in front of the target vehicle and a rear vehicle at a rear of the target vehicle;

obtaining, by the computing device, vehicle running information that comprises steering information of the target vehicle, the steering information including status of a turn signal light;

recognizing the driving video to obtain a driving video recognition result, the driving video recognition result comprising lane information and vehicle distance information; and determining, by the computing device, whether a dangerous driving behavior exists according to the driving video recognition result and the vehicle running information corresponding to a same time period, the dangerous driving behavior being a driving behavior having an accident risk, including departing from a lane without turning on the turn signal light.

2. The method according to claim 1, wherein the driving video recognition result further comprises relative speed information, wherein the lane information comprises a lane in which the target vehicle is located, the vehicle distance information comprises at least one of a distance to the front vehicle or a distance to the rear vehicle, and the relative speed information comprises at least one of a speed relative to the front vehicle or a speed relative to the rear vehicle.

3. The method according to claim 2, wherein the recognizing the driving video to obtain a driving video recognition result comprises at least one of:

recognizing a lane line comprised in the driving video, and determining the lane information according to the lane line;

recognizing an image location of the neighboring vehicle in the driving video, and determining the vehicle distance information according to the image location and a preset distance scale, the preset distance scale comprising mapping relationships between image locations in the driving video and actual distances; or recognizing an image location of the neighboring vehicle in the driving video, and determining the relative speed information according to a change of the image location.

4. The method according to claim 1, wherein after the determining whether the dangerous driving behavior exists according to the driving video recognition result and the vehicle running information, the method further comprises:

determining a danger level of the dangerous driving behavior;

calculating update data according to a frequency of occurrence of the dangerous driving behavior, the danger level, and a weight corresponding to the dangerous driving behavior; and updating driving behavior data corresponding to the target vehicle based on the update data.

5. The method according to claim 4, wherein the determining a danger level of the dangerous driving behavior comprises:

determining the danger level according to a current speed comprised in the vehicle running information and a traffic flow, when the dangerous driving behavior is departing from a lane without turning on the turn signal light; or determining the danger level according to the current speed and a current vehicle distance, when the dangerous driving behavior is keeping an excessively short distance between vehicles or applying emergency braking, wherein the current speed has a positive correlation with the danger level, the traffic flow has a positive correlation with the danger level, and the current vehicle distance has a negative correlation with the danger level.

6. The method according to claim 1, wherein the determining whether the dangerous driving behavior exists according to the driving video recognition result and the vehicle running information comprises:

determining that a first dangerous driving behavior exists in response to detecting that the lane information changes, a distance to the front vehicle is less than a first threshold based on the vehicle distance information, and no turn signal light has been turned on based on the steering information.

7. The method according to claim 1, wherein the driving video recognition result further comprises relative speed information, and the vehicle running information comprises a current speed; and the determining whether the dangerous driving behavior exists according to the driving video recognition result and the vehicle running information comprises:

determining a safe braking distance corresponding to the current speed, and determining that a second dangerous driving behavior exists in response to detecting that the distance to the front vehicle is less than the safe braking distance based on the vehicle distance information and detecting that the current speed is greater than a speed of the front vehicle the relative speed information, the second dangerous driving behavior being a driving behavior of keeping an excessively short distance between vehicles.

8. The method according to claim 1, wherein the vehicle running information comprises a current acceleration; and the determining whether the dangerous driving behavior exists according to the driving video recognition result and the vehicle running information comprises:

determining that a third dangerous driving behavior exists in response to detecting that a distance to the front vehicle is greater than a second threshold and a distance to the rear vehicle is less than a third threshold based on the vehicle distance information, and detecting that the target vehicle is braking based on the current acceleration, the third dangerous driving behavior being a driving behavior of applying emergency braking.

9. A driving behavior determining apparatus, comprising:
a memory; and
a processor coupled to the memory and configured to perform:

obtaining a driving video of a target vehicle, a content of the driving video comprising a road and a neighboring vehicle of the target vehicle, the neighboring vehicle comprising at least one of a front vehicle in front of the target vehicle and a rear vehicle at a rear of the target vehicle;

obtaining vehicle running information that comprises steering information of the target vehicle, the steering information including status of a turn signal light;

recognizing the driving video to obtain a driving video recognition result, the driving video recognition result comprising lane information and vehicle distance information; and determining whether a dangerous driving behavior exists according to the driving video recognition result and the vehicle running information corresponding to a same time period, the dangerous driving behavior being a driving behavior having an accident risk, including departing from a lane without turning on the turn signal light.

10. The apparatus according to claim 9, wherein the driving video recognition result further comprises relative speed information; wherein
the lane information comprises a lane in which the target vehicle is located,
the vehicle distance information comprises at least one of a distance to the front vehicle or a distance to the rear vehicle, and
the relative speed information comprises at least one of a speed relative to the front vehicle or a speed relative to the rear vehicle.

11. The apparatus according to claim 10, wherein the recognizing the driving video to obtain a driving video recognition result comprises at least one of:
recognizing a lane line comprised in the driving video, and determining the lane information according to the lane line;
recognizing an image location of the neighboring vehicle in the driving video, and determining the vehicle distance information according to the image location and a preset distance scale, the preset distance scale comprising mapping relationships between image locations in the driving video and actual distances; or
recognizing an image location of the neighboring vehicle in the driving video, and determining the relative speed information according to a change of the image location.

12. The apparatus according to claim 9, wherein after the determining whether the dangerous driving behavior exists according to the driving video recognition result and the vehicle running information, the processor is further configured to perform:
determining a danger level of the dangerous driving behavior;
calculating update data according to a frequency of occurrence of the dangerous driving behavior, the danger level, and a weight corresponding to the dangerous driving behavior; and
updating driving behavior data corresponding to the target vehicle based on the update data.

13. The apparatus according to claim 12, wherein the determining a danger level of the dangerous driving behavior comprises:
determining the danger level according to a current speed comprised in the vehicle running information and a traffic flow, when the dangerous driving behavior is departing from a lane without turning on the turn signal light; or
determining the danger level according to the current speed and a current vehicle distance, when the dangerous driving behavior is keeping an excessively short distance between vehicles or applying emergency braking, wherein
the current speed has a positive correlation with the danger level, the traffic flow has a positive correlation with the danger level, and the current vehicle distance has a negative correlation with the danger level.

14. The apparatus according to claim 9, wherein the determining whether the dangerous driving behavior exists according to the driving video recognition result and the vehicle running information comprises:
determining that a first dangerous driving behavior exists in response to detecting that the lane information changes, a distance to the front vehicle is less than a first threshold based on the vehicle distance information, and no turn signal light has been turned on based on the steering information.

15. The apparatus according to claim 9, wherein the driving video recognition result further comprises relative speed information, and the vehicle running information comprises a current speed; and
the determining whether the dangerous driving behavior exists according to the driving video recognition result and the vehicle running information comprises:
determining a safe braking distance corresponding to the current speed, and determining that a second dangerous driving behavior exists in response to detecting that the distance to the front vehicle is less than the safe braking distance based on the vehicle distance information and detecting that the current speed is greater than a speed of the front vehicle the relative speed information, the second dangerous driving behavior being a driving behavior of keeping an excessively short distance between vehicles.

16. The apparatus according to claim 9, wherein the vehicle running information comprises a current acceleration; and
the determining whether the dangerous driving behavior exists according to the driving video recognition result and the vehicle running information comprises:
determining that a third dangerous driving behavior exists in response to detecting that a distance to the front vehicle is greater than a second threshold and a distance to the rear vehicle is less than a third threshold based on the vehicle distance information, and detecting that the target vehicle is braking based on the current acceleration, the third dangerous driving behavior being a driving behavior of applying emergency braking.

17. A non-transitory computer-readable storage medium storing computer program instructions executable by at least one processor to perform:
obtaining a driving video of a target vehicle, a content of the driving video comprising a road and a neighboring vehicle of the target vehicle, the neighboring vehicle comprising at least one of a front vehicle in front of the target vehicle and a rear vehicle at a rear of the target vehicle;
obtaining vehicle running information that comprises steering information of the target vehicle, the steering information including status of a turn signal light;
recognizing the driving video to obtain a driving video recognition result, the driving video recognition result comprising lane information and vehicle distance information; and
determining whether a dangerous driving behavior exists according to the driving video recognition result and the vehicle running information corresponding to a same time period, the dangerous driving behavior being a driving behavior having an accident risk, including departing from a lane without turning on the turn signal light.

18. The storage medium according to claim 17, wherein after the determining whether the dangerous driving behavior exists according to the driving video recognition result and the vehicle running information, the computer instructions further cause the at least one processor to perform:
determining a danger level of the dangerous driving behavior;

calculating update data according to a frequency of occurrence of the dangerous driving behavior, the danger level, and a weight corresponding to the dangerous driving behavior; and updating driving behavior data corresponding to the target vehicle based on the update data.

19. The storage medium according to claim 18, wherein the determining a danger level of the dangerous driving behavior comprises:

determining the danger level according to a current speed comprised in the vehicle running information and a traffic flow, when the dangerous driving behavior is departing from a lane without turning on the turn signal light; or determining the danger level according to the current speed and a current vehicle distance, when the dangerous driving behavior is keeping an excessively short distance between vehicles or applying emergency braking, wherein the current speed has a positive correlation with the danger level, the traffic flow has a positive correlation with the danger level, and the current vehicle distance has a negative correlation with the danger level.

20. The storage medium according to claim 17, wherein the driving video recognition result further comprises relative speed information; wherein the lane information comprises a lane in which the target vehicle is located, the vehicle distance information comprises at least one of a distance to the front vehicle or a distance to the rear vehicle, and the relative speed information comprises at least one of a speed relative to the front vehicle or a speed relative to the rear vehicle.

* * * * *